United States Patent
Frueh et al.

(10) Patent No.: US 8,694,221 B2
(45) Date of Patent: Apr. 8, 2014

(54) METHOD FOR BRAKING A VEHICLE IN CRITICAL DRIVING SITUATIONS

(75) Inventors: Philipp Frueh, Clayton (AU); Rainer Brueggemann, Ludwigsburg (DE); Andreas Reize, Adelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 13/212,623

(22) Filed: Aug. 18, 2011

(65) Prior Publication Data

US 2012/0048637 A1   Mar. 1, 2012

(30) Foreign Application Priority Data

Aug. 25, 2010 (DE) .......... 10 2010 039 773

(51) Int. Cl.
| | |
|---|---|
| B60T 7/12 | (2006.01) |
| B60T 8/32 | (2006.01) |
| B60W 10/18 | (2012.01) |
| B60W 10/184 | (2012.01) |
| B60W 10/04 | (2006.01) |
| B60T 7/22 | (2006.01) |
| B60T 8/1755 | (2006.01) |
| B60T 8/48 | (2006.01) |
| B60T 13/58 | (2006.01) |
| B60W 10/11 | (2012.01) |
| B60W 10/196 | (2012.01) |
| B60W 10/30 | (2006.01) |
| B60W 30/18 | (2012.01) |

(52) U.S. Cl.
CPC ......... B60T 8/3215 (2013.01); B60T 7/22 (2013.01); B60T 8/1755 (2013.01); B60T 8/4809 (2013.01); B60T 13/585 (2013.01); B60T 2260/04 (2013.01); B60W 10/11 (2013.01); B60W 10/184 (2013.01); B60W 10/196 (2013.01); B60W 10/30 (2013.01); B60W 30/18109 (2013.01)
USPC ............... 701/70; 192/220; 477/185

(58) Field of Classification Search
CPC ............ B60T 8/4809; B60W 10/184
USPC ........... 180/271; 192/220; 477/185; 701/70
See application file for complete search history.

(56) References Cited

U.S. PATENT DOCUMENTS

| | | | |
|---|---|---|---|
| 7,416,071 B2 * | 8/2008 | Popp et al. ............. | 192/220 |
| 8,160,800 B2 * | 4/2012 | Hawkins et al. ......... | 701/101 |
| 2004/0119333 A1 * | 6/2004 | Hackl .................. | 303/125 |
| 2007/0192010 A1 * | 8/2007 | Carlstrom et al. ........ | 701/70 |

FOREIGN PATENT DOCUMENTS

| | | |
|---|---|---|
| FR | 2 840 577 | 12/2003 |
| WO | WO 96/02400 | 2/1996 |
| WO | WO 2010/000620 | 1/2010 |

* cited by examiner

*Primary Examiner* — John R Olszewski
*Assistant Examiner* — Todd Melton
(74) *Attorney, Agent, or Firm* — Kenyon & Kenyon LLP

(57) ABSTRACT

A method for braking a vehicle in a driving situation, in which an automatic braking function is active. The hydraulic pump of the brake control system may be sized to be relatively small and cost-effective, if, in critical driving situations, an additional braking device is automatically switched on or its braking capacity is increased, in order to assist the service brake and further decelerate the vehicle.

8 Claims, 1 Drawing Sheet

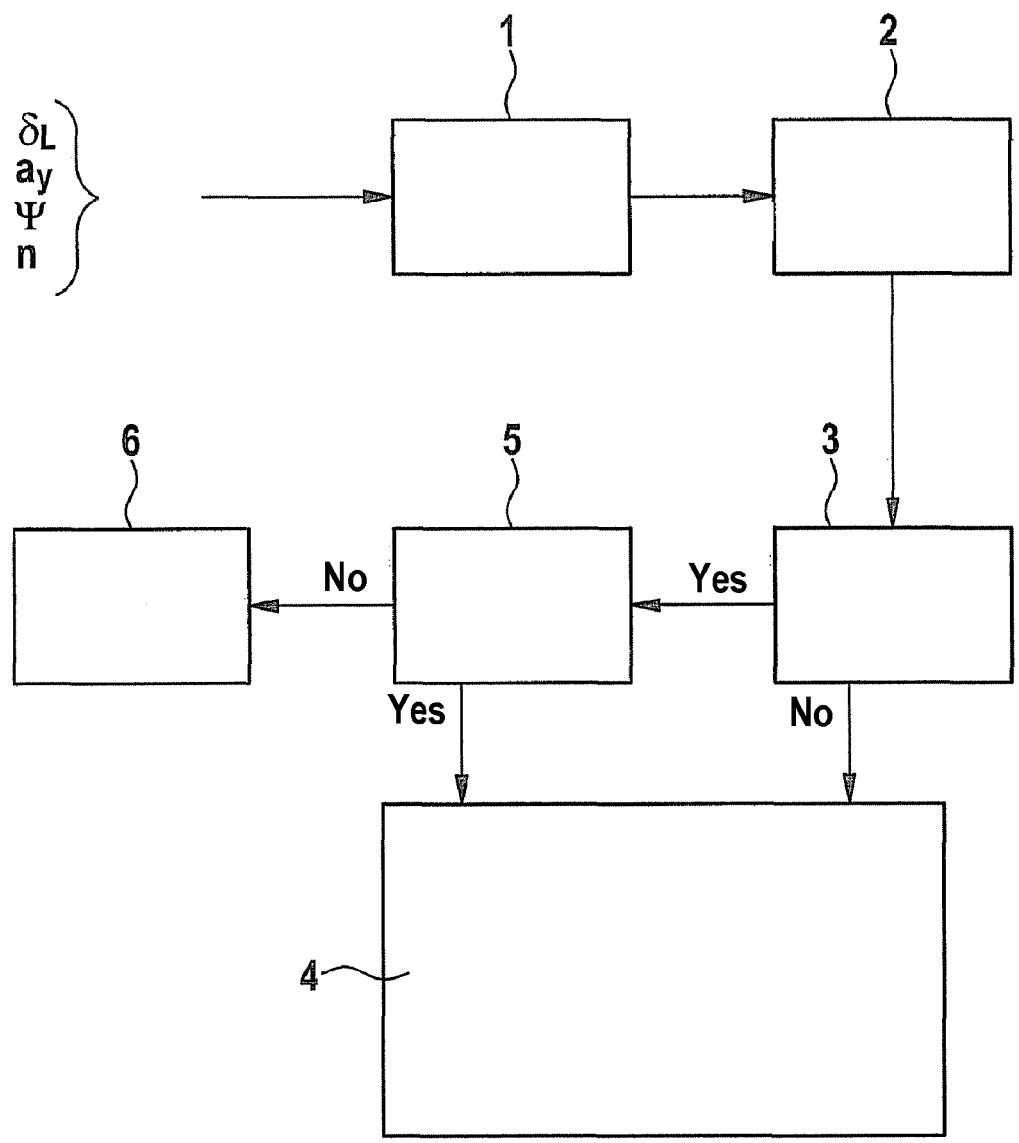

METHOD FOR BRAKING A VEHICLE IN CRITICAL DRIVING SITUATIONS

CROSS REFERENCE

The present application claims the benefit under 35 U.S.C. §119 of German Patent Application No. DE 102010039773.3, filed on Aug. 25, 2010, which is expressly incorporated herein by reference in its entirety.

FIELD OF THE INVENTION

The present invention relates to a method for braking a vehicle in critical driving situations, in which an automatic braking function is active.

BACKGROUND INFORMATION

When a vehicle travels into a curve at a speed that is too high, the transverse forces acting upon the vehicle may become so large, that the vehicle laterally tips over. Such conditions occur particularly often at highway exits having sharp curves. If the steering-angle, yaw or acceleration action of the vehicle exceeds specific threshold values, a vehicle dynamics controller automatically intervenes in the vehicle operation and brakes individual wheels, in order to stabilize the vehicle again.

In such automatic braking actions, a hydraulic pump is activated which conveys the brake fluid in the direction of the wheel brakes and therefore increases the braking pressure. In the case of hydraulically-braked, commercial vehicles having a total permissible weight of up to 15 t, in order to generate a braking pressure of, e.g., 100 bar, a relatively large volume of hydraulic fluid of up to 12.5 cm³ bar must be conveyed to the wheel brakes of each individual wheel. However, conventional braking systems of commercial vehicles up to 7.5 only have a delivery volume of up to 6 cm³ per wheel for such a pressure build-up. Therefore, in the case of commercial vehicles up to 15 t, the components of the braking system, in particular, the hydraulic pumps, must be sized considerably larger. Accordingly, they are correspondingly more expensive.

SUMMARY

An object of the present invention is to provide a braking system and a braking method for, in particular, vehicles having a total permissible weight of greater than 7.5 t; the braking system and braking method allowing a vehicle to be equipped, in the brake control system, with a hydraulic pump customary for a lighter vehicle class, but allowing the vehicle to be adequately stabilized.

In accordance with an example embodiment of the present invention, it is provided that, in critical driving situations in which an automatic braking function such as ESP becomes active, the vehicle be automatically braked by a further braking device. In this context, the further braking device may be newly switched on, or, if it was already active, its braking torque may be increased. In this case, the service brake and the additional braking device act together and jointly contribute towards decelerating the vehicle. This has the advantage that the hydraulic pump of the brake control system may remain relatively undersized, since in critical driving situations, it is assisted by an additional braking device. Consequently, a commercial vehicle having a total permissible weight of 15 t may have, for example, a hydraulic pump that is sized for vehicles up to a total permissible weight of 7.5 t.

In cases in which a higher pump delivery rate is necessary, the service brake system is assisted by the additional braking device.

The method and braking system of the present invention are preferably provided for use in medium-weight commercial vehicles having a total permissible weight of greater than 7.5 tons. The present invention may allow such vehicles to be equipped with a hydraulic pump that is normally designed for vehicles up to 7.5 t.

The additional braking device may be, for example, an automatic transmission that is automatically shifted into a lower gear, in order to increase the drag torque and brake the vehicle further.

Alternatively or additionally, a retarder may also be used as a braking device. In this case, in critical situations, the retarder is automatically switched on, or its braking torque is increased, in order to further decelerate the vehicle.

Moreover, an engine fan or other aggregates, as well as, e.g., electric load circuits, may be switched on in order to exert a drag torque directly or indirectly via a generator, the drag torque further decelerating the vehicle. Suitable electric load circuits include, for example, an air-conditioner compressor or a seat heater, etc.

According to a preferred, specific embodiment of the present invention, an algorithm is provided which, in a critical driving situation, calculates a setpoint braking torque or a different variable specific to braking, such as a braking force or a braking force gradient. When the output of the hydraulic service brake is not sufficient for braking the vehicle in accordance with the setpoint requirement, at least one further device is automatically switched on, or its braking action is increased. On the other hand, if the braking torque or the braking torque gradient of the hydraulic service brake is sufficiently large, then preferably no other braking device is switched on, and the braking is purely hydraulic.

Below, the present invention is explained in greater detail by way of example, with reference to the figure.

BRIEF DESCRIPTION OF THE DRAWING

FIG. 1 a schematic block diagram of an example method for braking a vehicle in critical driving situations.

DETAILED DESCRIPTION OF EXAMPLE EMBODIMENTS

FIG. 1 shows a schematic block diagram of a method for braking a vehicle in critical driving situations, in which a vehicle dynamics controller is active. In the method shown, in step 1, the vehicle operation is first monitored with regard to critical driving situations, in which the vehicle, e.g., oversteers or understeers or threatens to roll over. This is accomplished, for example, using a conventional ESP sensor system. In the present case, steering angle $\delta_L$, transverse acceleration $a_y$, yaw rate $\psi$ and the wheel speeds n are measured and evaluated. However, critical driving situations may also occur while driving straight ahead, e.g., when an obstacle is situated in front of the vehicle and a collision with the obstacle is imminent.

Provided that a critical driving situation was detected in block 1, then a setpoint braking torque or a variable proportional to it, such as a braking force, which is necessary for stabilizing the vehicle or preventing a collision in the specific situation, is calculated in block 2. In block 3, a query is made as to whether or not the braking torque available from the hydraulic braking system is large enough to decelerate the vehicle in accordance with the setpoint selection. If the braking capacity of the service brake is too small (block 5), an additional braking device is automatically switched on, or its braking torque is increased, in order to assist the service brake and to further decelerate the vehicle(block 4). Otherwise, the vehicle is braked purely hydraulically (block 6).

For example, in block 4, an automatic transmission, which is shifted into a lower gear, may be used as an additional braking device. In this manner, the drag torque increases, and the vehicle is braked further. Alternatively, or in addition, a retarder may also be used as an additional braking device for braking the vehicle further. Furthermore, an engine fan or other auxiliary units, as well as electric load circuits having a high, rated power output, may be used as an additional braking device. In operation, the above-mentioned elements generate a drag torque that reacts upon the wheels of the vehicle via the combustion engine and the drive train and brakes the vehicle further.

The example method of the present invention is preferably provided for use with medium-weight commercial vehicles having a total permissible weight of greater than 7.5 t. In the brake control system, the present invention may allow such vehicles to be equipped with a hydraulic pump that is dimensioned for vehicles up to 7.5 t.

What is claimed is:

1. A method for braking a vehicle having an undersized service brake and a further braking device in a driving situation, in which an automatic braking function is active, comprising:
   automatically switching on the further braking device, or, if the further braking device was already active, automatically increasing braking action of the further braking device in order to further decelerate the vehicle in addition to initial braking action of the undersized service brake.

2. The method as recited in claim 1, wherein an automatic transmission is used as the further braking device, and the automatic transmission is shifted into a lower gear in order to increase the drag torque and further decelerate the vehicle.

3. The method as recited in claim 1, wherein a retarder is used as the further braking device, and one of the retarder is switched on, or a braking torque of the retarder is increased, in order to further decelerate the vehicle.

4. The method as recited in claim 1, wherein at least one of an engine fan and an electric load circuit is switched on in order to further brake the vehicle.

5. The method as recited in claim 1, wherein one of a required setpoint braking torque or a variable proportional to the required setpoint braking torque is calculated, and the further braking device is automatically switched on, or a braking torque of the further braking device is increased, when the required setpoint braking torque is greater than a braking torque available from the undersized service brake of the vehicle.

6. The method as recited in claim 1, wherein the undersized service brake is sized for vehicles smaller in size than the vehicle.

7. The method as recited in claim 1, wherein the undersized service brake includes a hydraulic pump sized for vehicles smaller in size than the vehicle.

8. A control unit for braking a vehicle having a service brake and a further braking device in a driving situation in which automatic braking function is active, the control unit configured to perform the steps of:
   automatically switching on the further braking device, or, if the further braking device was already active, automatically increasing braking action of the further braking device in order to further decelerate the vehicle in addition to initial braking action of the service brake: wherein the service brake is undersized.

* * * * *